United States Patent
Fukui (10) Patent No.: US 8,659,705 B2
(45) Date of Patent: Feb. 25, 2014

(54) NOISE REDUCER

(75) Inventor: Katsuyuki Fukui, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/605,328

(22) Filed: Sep. 6, 2012

(65) Prior Publication Data

US 2013/0250176 A1   Sep. 26, 2013

(30) Foreign Application Priority Data

Mar. 26, 2012 (JP) ................................ 2012-069318
Jun. 14, 2012 (JP) ................................ 2012-135155

(51) Int. Cl.
*H04N 5/21*   (2006.01)

(52) U.S. Cl.
USPC .......................................... 348/607; 348/622

(58) Field of Classification Search
USPC ......................................................... 348/607
See application file for complete search history.

(56) References Cited

U.S. PATENT DOCUMENTS

2005/0243213 A1*  11/2005  Alvarez ......................... 348/618
2010/0188535 A1*   7/2010  Mitsuya et al. ............... 348/241
2010/0201828 A1*   8/2010  Mitsuya et al. ............. 348/208.6

FOREIGN PATENT DOCUMENTS

JP   2011-029826 A   2/2011
JP   2011-171795 A   9/2011

* cited by examiner

*Primary Examiner* — Jefferey Harold
*Assistant Examiner* — Justin Sanders
(74) *Attorney, Agent, or Firm* — Renner, Otto, Boisselle & Sklar, LLP (57) ABSTRACT

In a noise reducer, a first subtractor 101 generates a difference N1 between an input video signal Ynow and a delayed video signal Ypre output from a frame memory 104 and obtained by delaying an output video signal Yout by a time corresponding to one screen. An amplitude adjuster 102 adjusts the amplitude of an output signal of the first subtractor 101 based on a motion signal MV. A second subtractor 103 subtracts an output N2 of the amplitude adjuster 102 from the input video signal Ynow. A motion detector 2 calculates the amount of change in the input video signal Ynow with respect to the delayed video signal Ypre for each of pixels constituting one screen, and generates, as the motion signal MV, a signal determining, as "moving," a predetermined proportion of pixels for which the amount of change is smaller than a predetermined threshold value.

4 Claims, 9 Drawing Sheets

NOISE REDUCER

CROSS-REFERENCE TO RELATED APPLICATIONS

This application claims priority to Japanese Patent Applications Nos. 2012-069318 filed on Mar. 26, 2012 and 2012-135155 filed on Jun. 14, 2012, the disclosures of which including the specifications, the drawings, and the claims are hereby incorporated by reference in their entireties.

BACKGROUND

The present disclosure relates to noise reducers for reducing noise of video signals generated by digital signal processing.

There are various conventional techniques for reducing noise of video signals. These techniques include a technique of performing filtering along the time axis. The noise herein refers to noise generated at random. In the filtering, calculation is carried out using an input video signal Ynow and a delayed video signal Ypre obtained by delaying an output video signal Yout by a time corresponding to one screen, as follows:

$$Yout = Ynow + K \times (Ypre - Ynow)$$

In this calculation, a band-limiting filter using an IIR filter along the time axis is implemented, and bandwidth limitation is imposed along the time axis. For a still picture, noise along the time axis attenuates. In the above equation, K is a filter coefficient ranging from 0 to 1. For a moving picture, since the use of the band-limiting filter causes an afterimage, motion detection is employed and, if motion is detected, the IIR filter is turned off. In detecting motion, if the difference between the input video signal Ynow and the delayed video signal Ypre is large, the picture is determined as a moving picture, whereas if the difference is small, the picture is determined as a still picture.

However, the influence of noise might cause erroneous motion detection, resulting in that a filter operates even when the filter is not needed, and thereby, an afterimage occurs in some cases. To prevent this, in the technique described in Japanese Patent Publication No. 2011-29826, noise is removed according to the amount of motion, thereby reducing an afterimage occurring in a portion where the motion is detected.

Figure 9:
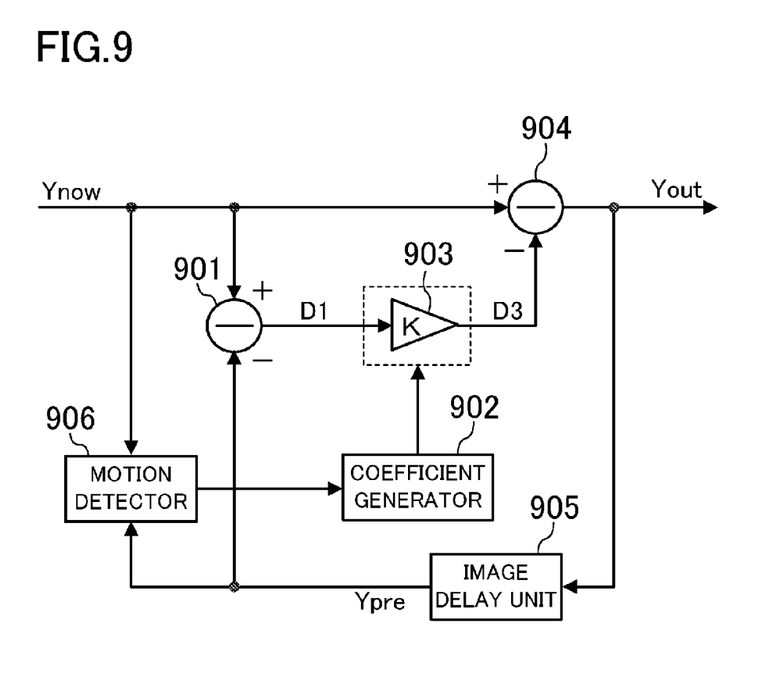
FIG. 9 is a block diagram of a conventional noise reducer.
Figure 10:
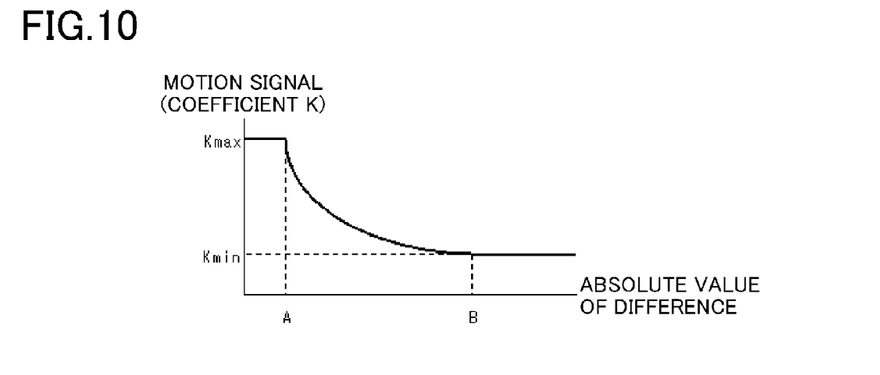
FIG. 10 is a graph showing characteristics of a noise attenuation coefficient of the conventional noise reducer.

FIG. 9 illustrates operation and a configuration of a noise reducer described in Japanese Patent Publication No. 2011-29826. FIG. 10 shows characteristics of a coefficient generator shown in FIG. 9. With reference to FIGS. 9 and 10, an outline of operation will now be described.

In FIG. 9, an output video signal Yout obtained by reducing noise from an input video signal Ynow is delayed by a time corresponding to one screen in an image delay unit 905, thereby producing a delayed video signal Ypre. Then, a subtractor 901 subtracts the delayed video signal Ypre from the input video signal Ynow to produce a signal D1. A multiplier 903 multiplies the signal D1 by an attenuation coefficient K generated by a coefficient generator 902, thereby producing a signal D3. Thereafter, the signal D3 is subtracted from the input video signal Ynow, thereby obtaining an output video signal Yout from which noise have been removed. The coefficient generator 902 generates an attenuation coefficient K which is a motion signal having characteristics shown in FIG. 10, with respect to the absolute value of the difference between the average input video signal Ynow and the average delayed video signal Ypre for peripheral pixels obtained by a motion detector 906. In this manner, a pixel for which the signal D1 has a value equal to or smaller than an absolute value A of the difference is determined to be "still", a pixel for which the signal D1 has a value between the absolute value A of the difference and an absolute value B of the difference is determined as a zone where the boundary between "still" and "moving" is unclear, and a pixel for which the signal D1 has a value equal to or larger than the absolute value B of the difference is determined to be "moving." Noise is attenuated to some degree in the zone where the boundary between "still" and "moving" is unclear, thus reducing an afterimage.

SUMMARY

However, some pictures having extremely small contrasts are determined to be "still" even in the presence of motion (e.g., near the point A in FIG. 10). Since such a picture is determined to be substantially "still," even in the presence of motion, processing on a still picture, i.e., a band-limiting filter along the time axis, is performed, thereby causing an afterimage.

Figure 11A:
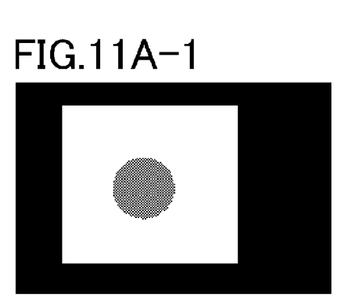
Figure 11A:
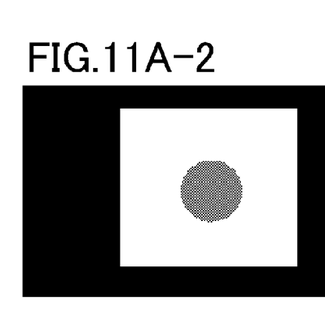
Figure 11B:
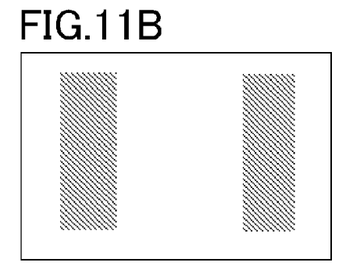
FIG. 11B is a view showing an image of a region of one screen where motion is detected.
Figure 11C:
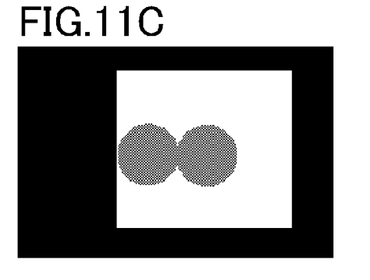
FIG. 11C is a view showing an image where an afterimage occurs in a conventional technique.
Figure 12A:
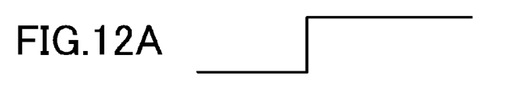
FIG. 12A shows an example of a waveform in a current frame.
Figure 12B:
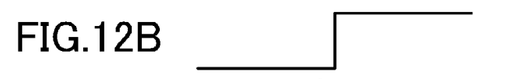
FIG. 12B shows an example of a waveform in a subsequent frame.
Figure 12C:
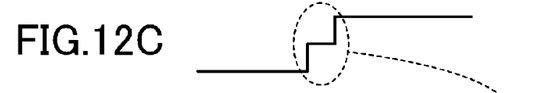
FIG. 12C shows a waveform of a video signal Yout after noise reduction in the subsequent frame.
Figure 12D:
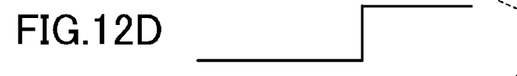
FIG. 12D shows an example of a waveform in a further subsequent frame.
Figure 12E:
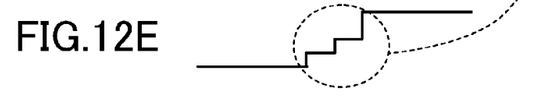
FIG. 12E shows a waveform of the video signal Yout after noise reduction in the further subsequent frame.

Referring now to FIG. 12, it will be described how an afterimage occurs. Suppose a waveform shown in FIG. 12A changes to a waveform shown in FIG. 12B in the subsequent frame, and the waveform in FIG. 12B changes to a waveform shown in FIG. 12D in the further subsequent frame. Suppose a feedback coefficient K of a filter is 0.5, an output video signal Yout has a waveform shown in FIG. 12C based on the equation: Yout=Ynow+K×(Ypre−Ynow). Likewise, in the still further subsequent frame, calculation is performed using a video signal Ypre having the waveform of FIG. 12C and an input video signal Ynow having the waveform of FIG. 12D. Thus, the output video signal Yout has a waveform shown in FIG. 12E. Portions enclosed by dotted lines in the waveforms of FIGS. 12C and 12E show an afterimage. In practice, the coefficient K is smaller than 0.5, and portions showing an afterimage are smaller. However, in some pictures, signals with such small amplitudes are conspicuous, thus degrading the quality of the pictures. Specifically, as illustrated in FIGS. 11A-11C, when an image shown in FIG. 11A-1 changes to an image shown in FIG. 11A-2 in the subsequent frame, a large difference in contrast between a bright gray square and a black background enables motion to be detected as indicated by hatched areas in an image shown in FIG. 11B. On the other hand, a small difference in contrast between the bright gray square and a slightly dark gray circle in the bright gray square does not enable motion to be detected. Consequently, as illustrated in an image shown in FIG. 11C, an afterimage of the slightly dark gray circle occurs. In FIGS. 11A-11C, darkness is emphasized so as to distinguish the shapes of circles.

It is therefore an object of the present disclosure to provide a noise reducer which can effectively reduce an afterimage while effectively obtaining advantages of noise reduction by a band-limiting filter along the time axis even when motion is detected in a picture with a low contrast.

To achieve the object, in an aspect of the present disclosure, a noise reducer includes: a first subtractor configured to generate a difference N1 between an input video signal Ynow and a delayed video signal Ypre obtained by delaying an output video signal Yout by a time corresponding to one screen; an amplitude adjuster configured to adjust an amplitude of an output signal of the first subtractor based on a motion signal MV; a second subtractor configured to subtract an output N2 of the amplitude adjuster from the input video signal Ynow, thereby generating the output video signal Yout; a frame memory configured to generate the delayed video signal Ypre obtained by delaying the output video signal Yout of the second subtractor by a time corresponding to one screen; and a motion detector configured to calculate an amount of change in the input video signal Ynow with respect to the delayed video signal Ypre for each of pixels constituting one screen, and generate the motion signal MV for each of pixels such that the motion signal MV determines, as "moving," each of pixels of a predetermined proportion of all the pixels for each of which the amount of change is smaller than a predetermined threshold value.

Accordingly, according to the present disclosure, a predetermined proportion (e.g., 50%) of pixels for which the amount of change of an input video signal Ynow to a delayed video signal Ypre is equal to or larger than a predetermined threshold value, i.e., a predetermined proportion (e.g., 50%) of pixels which are not clearly determined to be "moving" (all the pixels for which "still" and "moving" are unclear) are determined as "moving." The determinations are performed repeatedly on each image, and the repetitive determinations exponentially lower the number of pixels successively determined as "still." Accordingly, even when motion occurs in a low-contrast image, an afterimage can be rapidly reduced.

In addition, in the amplitude adjuster, the amplitude value (i.e., a conventional filter coefficient) does not need to be set at a small value so as to reduce an afterimage, and can be set a relatively large value. Accordingly, a band-limiting filter along the time axis can effectively operate, and noise reduction can be effectively achieved.

As described above, a noise reducer according to the present disclosure can effectively reduce an afterimage while effectively obtaining advantages of noise reduction by a band-limiting filter along the time axis even when motion occurs in a low-contrast picture.

BRIEF DESCRIPTION OF THE DRAWINGS

FIG. 2A-1 is a view showing an image of a delayed video signal Ypre, FIG. 2A-2 is a view showing an image of an input video signal Ynow, FIG. 2B-1 is a view showing an image of a region of one screen determined as "motion" by a motion signal M1, FIG. 2B-2 is a view showing an image of a region of one screen determined as "still" by the motion signal M1.

FIG. 11A-1 is a view showing an image of a delayed video signal Ypre, FIG. 11A-2 is a view showing an image of an input video signal Ynow.

DETAILED DESCRIPTION

Embodiments are described in detail below with reference to the attached drawings. However, unnecessarily detailed description may be omitted. For example, detailed description of well known techniques or description of substantially the same elements may be omitted. Such omission is intended to prevent the following description from being unnecessarily redundant and to help those skilled in the art easily understand it.

Inventors provide the following description and the attached drawings to enable those skilled in the art to fully understand the present disclosure. Thus, the description and the drawings are not intended to limit the scope of the subject matter defined in the claims.

First Embodiment

<Configuration of Noise Reducer 1>

Figure 1:
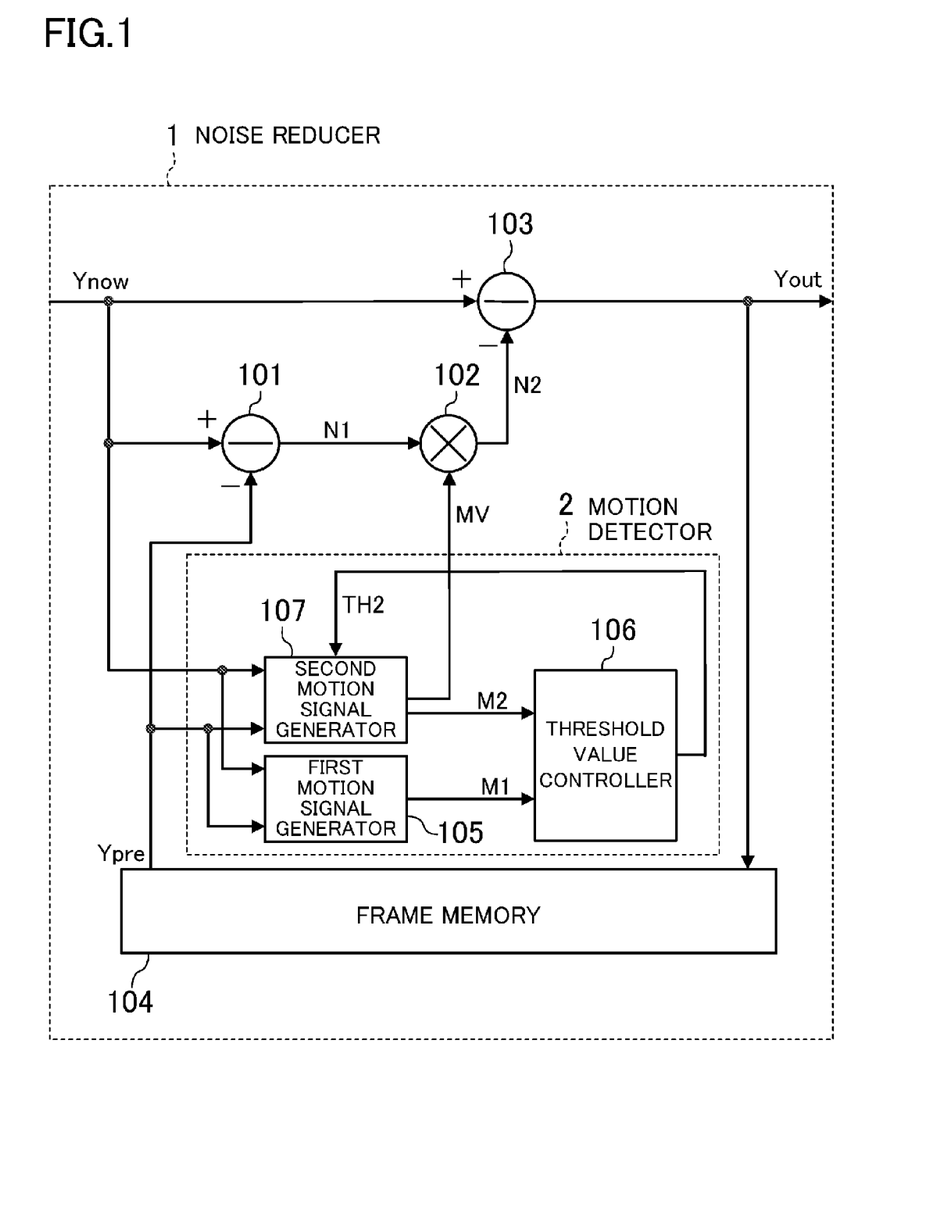
FIG. 1 is a block diagram of a noise reducer according to a first embodiment of the present disclosure.

FIG. 1 illustrates a configuration of a noise reducer 1 according to a first embodiment of the present disclosure.

As illustrated in FIG. 1, the noise reducer 1 includes: a first subtractor 101 configured to subtract a delayed video signal Ypre from an input video signal Ynow to generate a signal N1; an amplitude adjuster 102 configured to adjust the amplitude of the signal N1 based on a motion signal MV generated by a motion detector 2 to generate a signal N2; a second subtractor 103 configured to subtract the signal N2 from the input video signal Ynow to generate an output video signal Yout; the motion detector 2 configured to detect motion based on the input video signal Ynow and the delayed video signal Ypre to generate the motion signal MV; and a frame memory 104 configured to delay the output video signal Yout by a time corresponding to one screen.

The motion detector 2 includes: a first motion signal generator 105 configured to generate a motion signal M1 which determines a pixel as "moving" when the absolute value of the difference between the input video signal Ynow and the delayed video signal Ypre is equal to or larger than a first threshold value TH1 and determines the pixel as "still" when the absolute value is smaller than the first threshold value TH1; a second motion signal generator 107 configured to generate a motion signal M2 which determines a pixel as "moving" when the absolute value of the difference between the input video signal Ynow and the delayed video signal Ypre is equal to or larger than a second threshold value TH2, which is a predetermined value less than the first threshold value TH1, and determines the pixel as "still" when the absolute value is smaller than the second threshold value TH2; and a threshold value controller 106 configured to raise/lower the second threshold value TH2 in the next field such that the motion signal M2 determines, as "moving," a half (i.e., a predetermined proportion) of pixels determined as "still" by the motion signal M1 in the current field among all the pixels constituting one screen.

<Operation of Noise Reducer 1>

Operation of the noise reducer 1 illustrated in FIG. 1 will be described with reference to FIGS. 2 and 3.

Figure 2A:
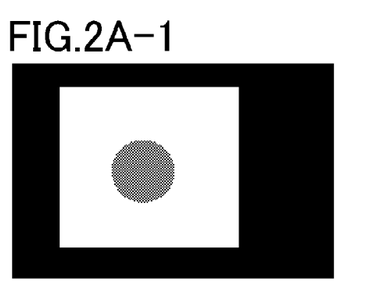
Figure 2A:
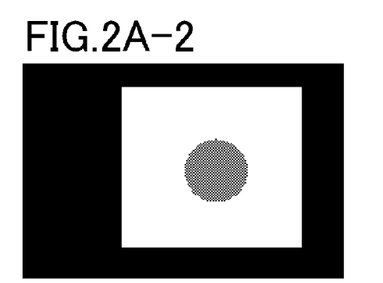
Figure 2B:
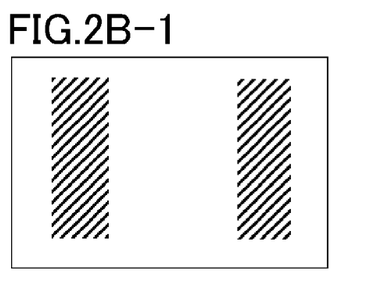

Suppose an image in which a bright gray square is present in a black background and includes a slightly dark gray circle whose level difference with respect to the bright gray square is equal to or smaller than the first threshold value TH1 as in FIG. 2A-1 is in a "still" state, and then the bright gray square moves (i.e., motion occurs) in the next frame as shown in FIG. 2A-2. Operation when the image shown in FIG. 2A-2 is input as an image of the input video signal Ynow in FIG. 1 will be described.

Figure 2B:
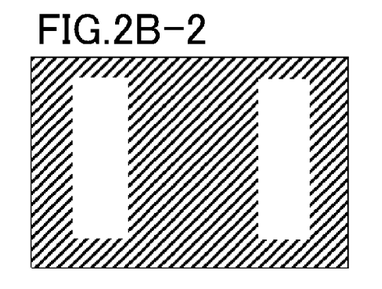
Figure 2C:
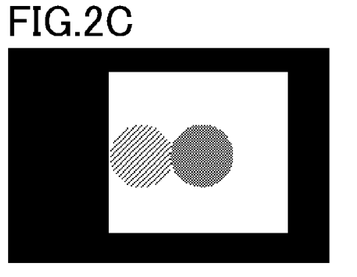
FIG. 2C is a view showing an image in which an afterimage is reduced.

First, FIG. 2A-1 shows the image of the delayed video signal Ypre, and the first subtractor 101 generates a signal N1 obtained by subtracting the delayed video signal Ypre from the input video signal Ynow. In the amplitude adjuster 102, the signal N1 is multiplied by a coefficient K (e.g., 0.5) and the resultant value is output as a signal N2 when the motion signal MV is "0" (i.e., corresponds to "still"). On the other hand, when the motion signal MV is "1" (i.e., corresponds to "moving"), the amplitude adjuster 102 outputs "0" as the signal N2. The motion signal MV is "1" for the entire hatched areas in FIG. 2B-1 and a predetermined proportion (e.g., 50%) of the hatched area in FIG. 2B-2. Thereafter, the second subtractor 103 subtracts the signal N2 from the input video signal Ynow, thereby generating an output video signal Yout. Accordingly, the output video signal Yout is a signal obtained by subtracting the signal N2 from the input video signal Ynow when the motion signal MV is "0" (i.e., corresponds to "still"), and is the input video signal Ynow without change when the motion signal MV is "1" (i.e., corresponds to "moving"). Thus, as shown in FIG. 2C, an afterimage (i.e., a hatched circle at the left) of the slightly dark gray circle in the bright gray square is reduced. The reduction of an afterimage will be described in detail in the following section for operation of the motion detector 2.

Then, operation of the motion detector 2 will be described.

The first motion signal generator 105 determines a pixel as "moving" when the absolute value of the difference between the input video signal Ynow and the delayed video signal Ypre is equal to or larger than the first threshold value TH1 to output "1" as a motion signal M1, and determines the pixel as "still" when the absolute value is smaller than the first threshold value TH1 to output "0" as a motion signal M1. Likewise, the second motion signal generator 107 determines a pixel as "moving" when the absolute value of the difference between the input video signal Ynow and the delayed video signal Ypre is equal to or larger than the second threshold value TH2 to output "1" as a motion signal M2, and determines the pixel as "still" when the absolute value is smaller than the second threshold value TH2 to output "0" as a motion signal M2. The threshold value controller 106 raises the second threshold value TH2 if the proportion of pixels for which the signal MV is "1" is larger than 50% when the output of the first motion signal generator is "0", i.e., "still." On the other hand, the threshold value controller 106 lowers the second threshold value TH2 if the proportion of pixels for which the signal MV is "1" is smaller than 50%. This motion signal M2 is output as the motion signal MV from the motion detector 2, and is input to the amplitude adjuster 102.

Figure 3:
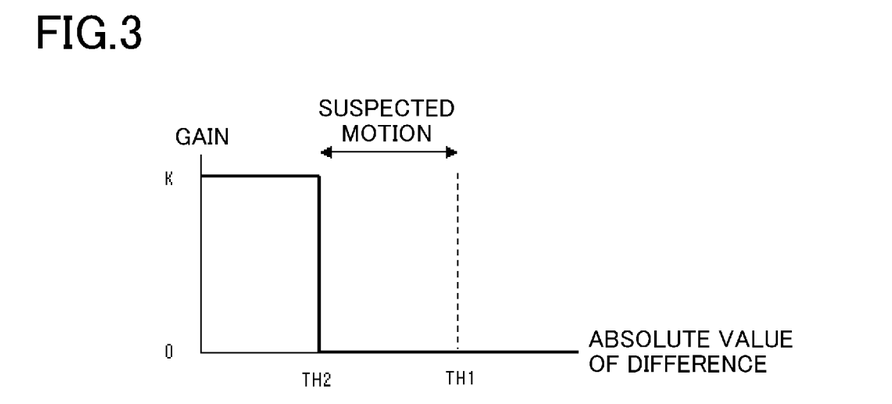
FIG. 3 is a graph showing characteristics in adjusting the amplitude of noise in the first embodiment.

In this manner, as shown in FIG. 3, in pixels for which the absolute value of the difference between the input video signal Ynow and the delayed video signal Ypre is equal to or smaller than the first threshold value TH1 among all the pixels constituting one screen, 50% of the hatched area in FIG. 2B-2 is determined as "moving." Then, in the next frame, further 50% of the 50% pixels determined as "still" is determined as "moving." Accordingly, the number of pixels determined as "still" in two successive frames, i.e., the number of pixels showing an afterimage, is 25% of all the pixels constituting one screen. In the same manner, the number of pixels successively determined as "still" decreases by 50% at each frame, and the number of pixels successively determined as "still" is less than 1% at the seventh frame. In addition, such pixels showing an afterimage are dispersed in a screen, and thus, an afterimage is hardly observed. In this manner, the above control of lowering the proportion of pixels for which the motion signal MV is "1" to a predetermined proportion (e.g., 50%) can reduce an afterimage. Thus, in the amplitude adjustment (i.e., adjustment of the coefficient K) by the amplitude adjuster 102, the coefficient K does not need to be set at a small value (e.g., K=0.1) so as to reduce an afterimage, and can be set at a relatively large value (e.g., K=0.5). Accordingly, a band-limiting filter along the time axis can effectively operate on 50% of the region except for a region which is clearly determined as "moving," and noise reduction by bandwidth limitation along the time axis can be effectively achieved.

Through the foregoing operation, even when motion occurs in a low-contrast image, an afterimage can be effectively reduced while effectively achieving noise reduction by bandwidth limitation along the time axis.

In generation of the motion signal M1, motion signals may be generated from signals of green, blue, and red, which are three primary color of light, such that a pixel is determined as "moving" if the pixel is determined as "moving" by one of the three motion signals. Alternatively, motion signals may be generated from a luminance signal and a color-difference signal such that a pixel is determined as "moving" if the pixel is determined as "moving" by one of the motion signals.

In the same manner as FIG. 11, FIG. 2 emphasizes the amount of movement of the square and the difference in brightness among the circles and the square for easy understanding.

In addition, in this embodiment, the second threshold value TH2 is controlled such that the motion signal M2 determines, as "moving," 50% (i.e., a predetermined proportion) of all the pixels determined as "not moving" by the motion signal M1. However, the present disclosure is not limited to this example, and the predetermined proportion may be a percentage except for 50%.

Second Embodiment

<Configuration of Noise Reducer 1B>

Figure 4:
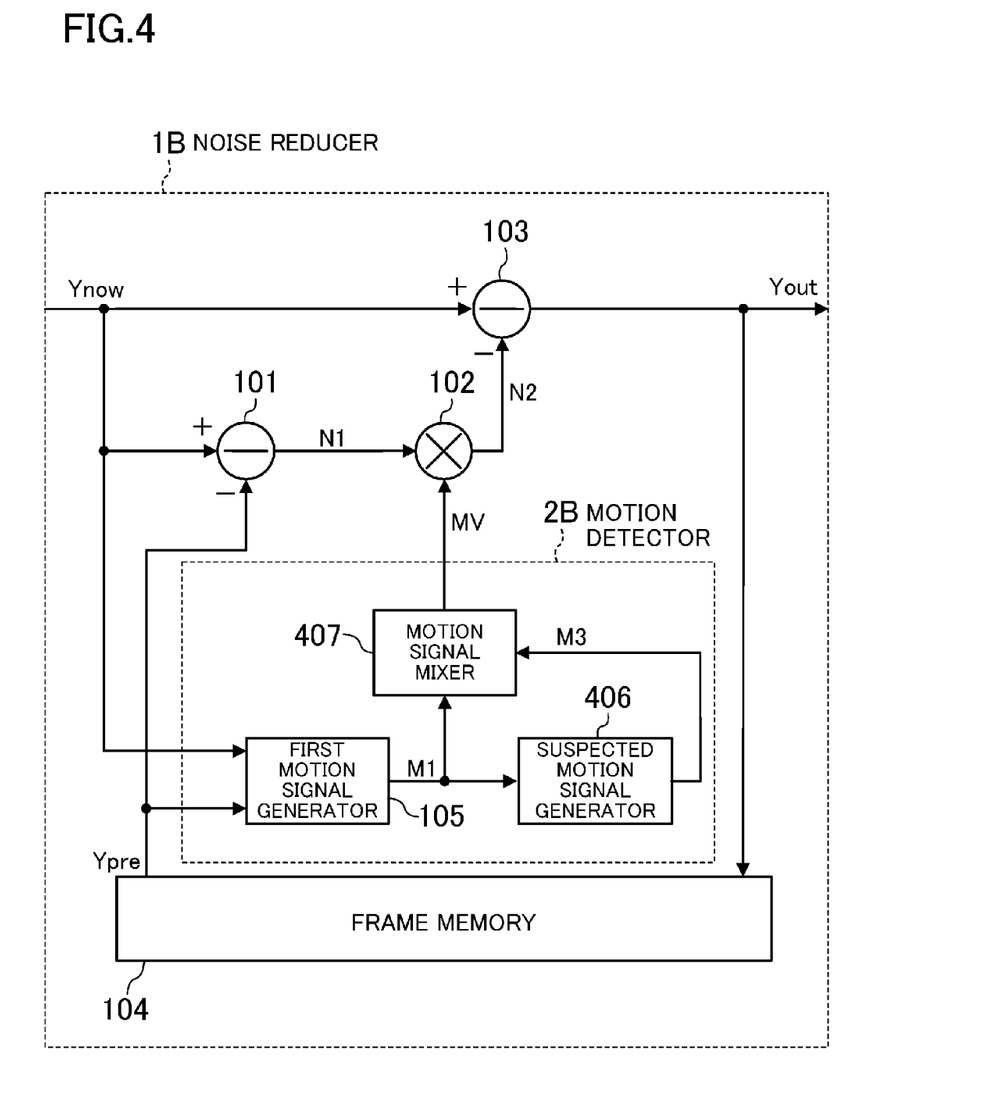
FIG. 4 is a block diagram of a noise reducer according to a second embodiment of the present disclosure.

FIG. 4 illustrates a configuration of a noise reducer 1B according to a second embodiment of the present disclosure. Substantially the same part of the configuration as that of the first embodiment may not be repeated in the following embodiment.

As illustrated in FIG. 4, the noise reducer 1B has the same configuration as that of the noise reducer 1 except for a motion detector 2B. Thus, the configuration of the motion detector 2B will be described hereinafter.

The motion detector 2B includes: a first motion signal generator 105 configured to generate a motion signal M1 which determines a pixel as "moving" when the absolute value of the difference between an input video signal Ynow and a delayed video signal Ypre is equal to or larger than a first threshold value TH1 and determines the pixel as "still" when the absolute value is smaller than the first threshold value TH1; a suspected motion signal generator 406 configured to generate a motion signal M3 which determines at random, as "moving", 50% of pixels determined as "still" by the motion signal M1; and a motion signal mixer 407 configured to generate a motion signal MV which determines a pixel as "moving" when one of the motion signal M1 or the motion signal M3 determines the pixel as "moving."

<Operation of Noise Reducer 1B>

Operation of the noise reducer 1B except for operation of the motion detector 2B is the same as that in the first embodiment, and thus, the operation of the motion detector 2B will be described.

Figure 5:
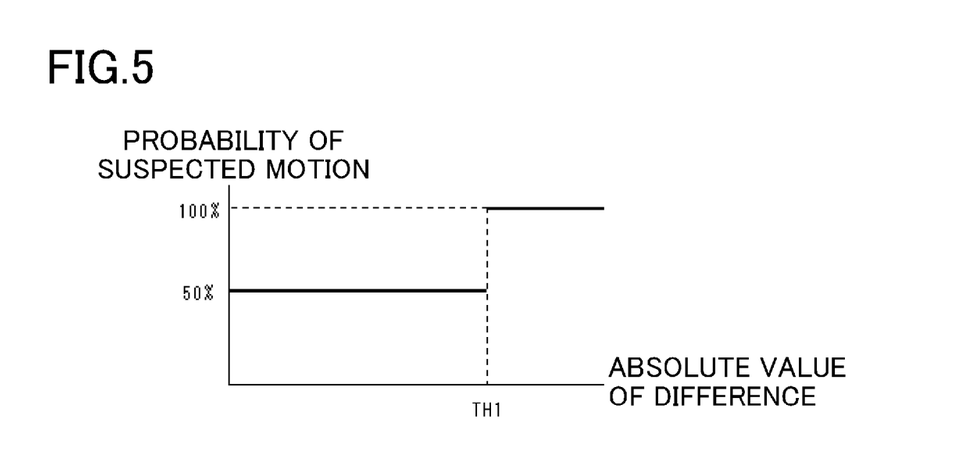
FIG. 5 is a graph showing an example of the probability of generation of a suspected motion signal in the second embodiment.

The first motion signal generator 105 determines a pixel as "moving" when the absolute value of the difference between the input video signal Ynow and the delayed video signal Ypre is equal to or larger than the first threshold value TH1 to output "1" as a motion signal M1, and determines the pixel as "still" when the absolute value is smaller than the first threshold value TH1 to output "0" as the motion signal M1. The suspected motion signal generator 406 generates a random number when the motion signal M1 is "0," i.e., indicates "still," and as shown in FIG. 5, generates the motion signal M3 determining, as "moving," 50%, i.e., a predetermined proportion, of pixels at random. A motion signal mixer 407 generates a motion signal MV determining a pixel as "moving" when one of the motion signal M3 or the motion signal M4 determines the pixel as "moving."

In the manner described above, 50% of the hatched area in FIG. 2B-2 is determined as "moving." Thus, as in the first embodiment, even when motion occurs in a low-contrast image, an afterimage can be effectively reduced while effectively achieving noise reduction by a band-limiting filter along the time axis.

The second embodiment is different from the first embodiment in that pixels for which the motion signal MV indicates "1" when the motion signal M1 is "0" depends on the image in the first embodiment, whereas 50% of pixels are uniformly determined as "moving" irrespective of the image in the second embodiment. This distinguished feature of the second embodiment is advantageous because a picture image, which is inherently flat, has minute unevenness in the strict sense due to characteristics of camera lenses and imaging devices, and such a picture image can be reduced irrespective of the influence of the unevenness.

Figure 6:
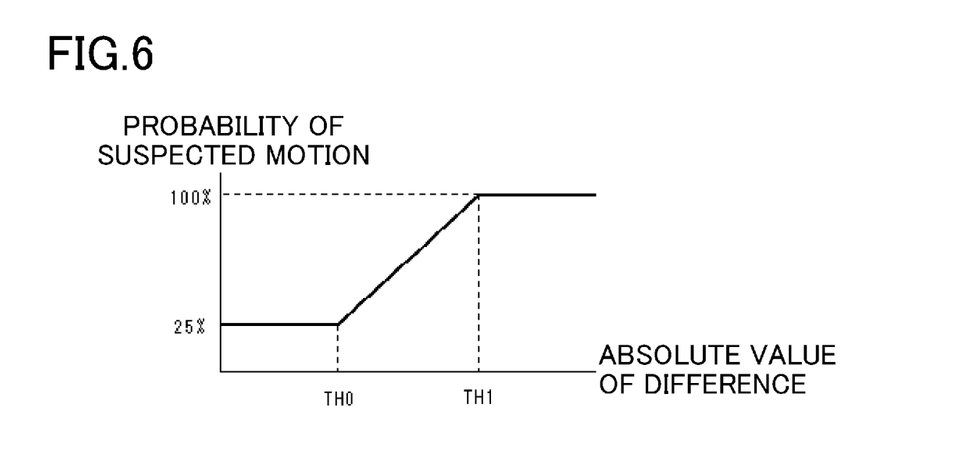
FIG. 6 is a graph showing another example of the probability of generation of the suspected motion signal in the second embodiment.

In addition, as shown in FIG. 6, the probability of motion may be changed according to the absolute value of the difference between the input video signal Ynow and the delayed video signal Ypre. Further, the probability of motion may be changed based on the determination of the state of an image such that the probability of motion has characteristics shown in FIG. 6 in a region including a large number of high frequency components and, on the other hand, has characteristics shown in FIG. 5 in a region including a small number of high frequency components.

In generation of the motion signal M1, motion signals may be generated from signals of green, blue, and red, which are three primary color of light, such that a pixel is determined as "moving" if the pixel is determined as "moving" by one of the three motion signals. Alternatively, motion signals may be generated from a luminance signal and a color-difference signal such that a pixel is determined as "moving" if the pixel is determined as "moving" by one of the motion signals.

In the second embodiment, the suspected motion signal generator 406 generates the motion signal M3 which determines, as "moving," 50% (i.e., a predetermined proportion) of pixels at random. However, the present disclosure is not limited to this example, and the predetermined proportion may be a percentage except for 50%.

Third Embodiment

<Configuration of Noise Reducer 1C>

Figure 7:
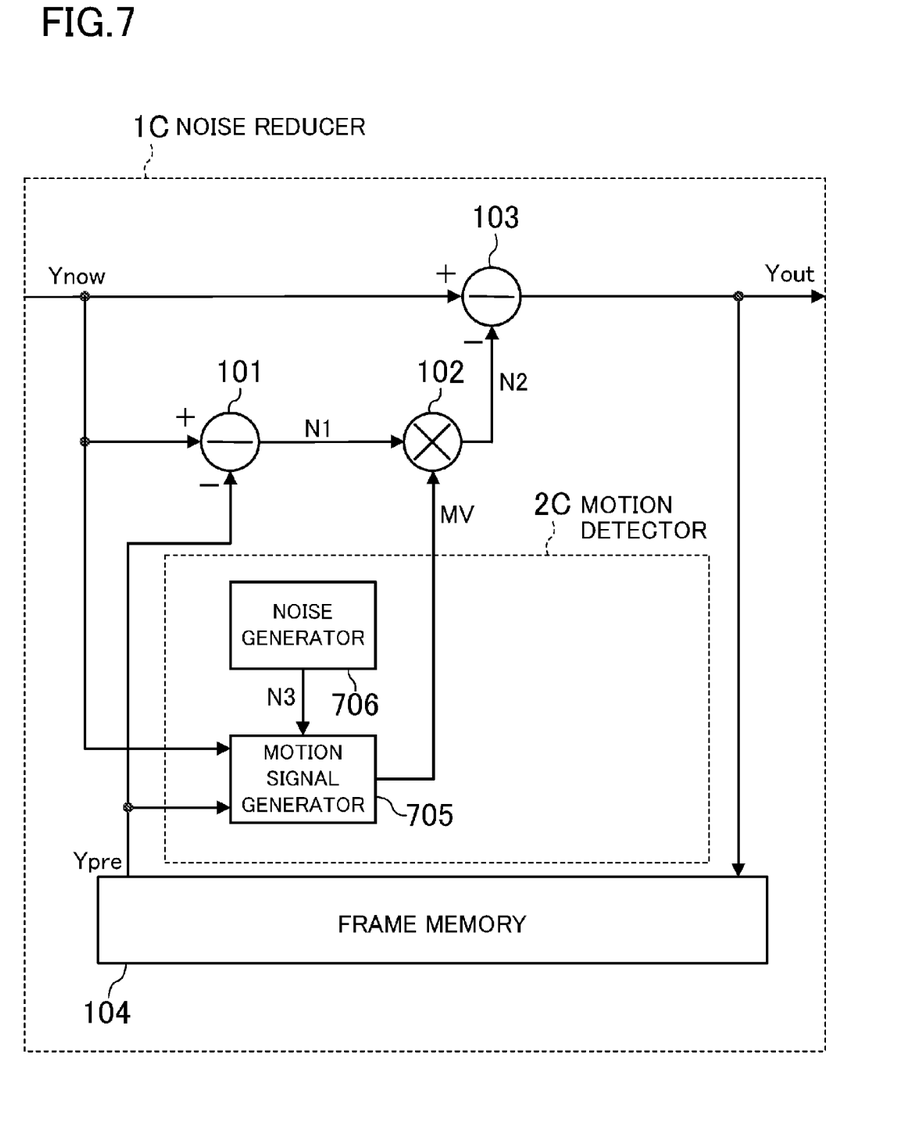
FIG. 7 is a block diagram of a noise reducer according to a third embodiment of the present disclosure.

FIG. 7 illustrates a configuration of a noise reducer 1C according to a third embodiment of the present disclosure. Substantially the same part of the configuration as that of the first embodiment may not be repeated in the following embodiment.

As illustrated in FIG. 7, the noise reducer 1C has the same configuration as that of the noise reducer 1 except for a motion detector 2C. Thus, the configuration of the motion detector 2C will be described hereinafter.

The motion detector 2C includes a motion signal generator 705 and a noise generator 706. The noise generator 706 generates a random noise N3, and supplies the random noise N3 to the motion signal generator 705. The motion signal generator 705 compares a first threshold value TH1 with each of the absolute value of the difference between an input video signal Ynow and a delayed video signal Ypre and a signal obtained by adding the random noise N3 to the absolute value. Then, the motion signal generator 705 generates a motion signal MV which determines a pixel as "moving" if at least one of the absolute value or the signal obtained by adding the random noise N3 to the absolute value is equal to or larger than the first threshold value TH1, and otherwise determines the pixel as "still."

<Operation of Noise Reducer 1C>

Operation of the noise reducer 1C except for operation of the motion detector 2C is the same as that in the first embodiment, and thus, the operation of the motion detector 2C will be described.

The motion signal generator 705 determines a pixel as a "moving" and outputs "1" as a motion signal MV when the absolute value of the difference between the input video signal Ynow and the delayed video signal Ypre is equal to or larger than the first threshold value TH1 and when a signal obtained by adding the dummy noise signal N3 supplied from the noise generator 706 to the absolute value of the difference between the input video signal Ynow and the delayed video signal Ypre. When both of the absolute value and the signal described above are "0," the motion signal generator 705 outputs "0" as the motion signal MV.

In the manner described above, 50% of pixels determined as "still" for which the absolute value of the difference is smaller than the first threshold value TH1, are determined as "moving" at random. Thus, as in the first embodiment, even when motion occurs in a low-contrast image, an afterimage can be effectively reduced while effectively achieving noise reduction by bandwidth limitation along the time axis.

Figure 8:
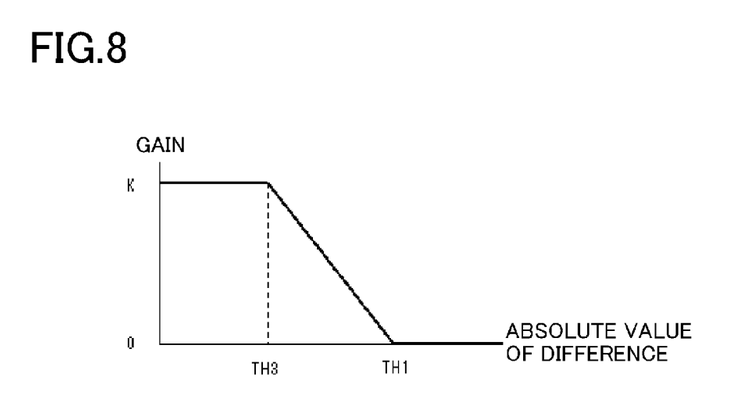
FIG. 8 is a graph showing characteristics of a noise attenuation coefficient in the third embodiment.

At this time, as described in the first embodiment, the amplitude adjuster 102 may perform such control that not only ON/OFF of addition of the signal N2 but also, as shown in FIG. 8, a value obtained by adding the signal N3 to the absolute value of the difference between the input video signal Ynow and the delayed video signal Ypre is employed to obtain characteristics as shown in FIG. 8.

In generation of the motion signal M1, motion signals may be generated from signals of green, blue, and red, which are three primary color of light, such that a pixel is determined as "moving" if the pixel is determined as "moving" by one of the three motion signals. Alternatively, motion signals may be generated from a luminance signal and a color-difference signal such that a pixel is determined as "moving" if the pixel is determined as "moving" by one of the motion signals.

In the third embodiment, the suspected motion signal generator 406 generates the motion signal M3 which determines, as "moving," 50% (i.e., a predetermined proportion) of pixels at random. However, the present disclosure is not limited to this example, and the predetermined proportion may be a percentage except for 50%.

As described above, the first through third embodiments have been described as example techniques of the present application. However, the techniques according to the present disclosure are not limited to these embodiments, but are also applicable to those where modifications, substitutions, additions, and omissions are made. In addition, elements described in the first to third embodiments may be combined to provide a different embodiment.

In particular, the use of a microcomputer programmable as an example of the motion detector 2, 2B, or 2C can change processing through changes of programs. Thus, flexibility in designing the motion detector 2, 2B, or 2C can be enhanced. The motion detector 2, 2B, and 2C may be implemented as a hard logic circuit. When the motion detector 2, 2B, or 2C is implemented as a hard logic circuit, the processing speed can be enhanced. The motion detector 2, 2B, or 2C may be constituted by one device, or may be physically constituted by a plurality of devices. In the case where the motion detector 2, 2B, or 2C is physically constituted by a plurality of devices, operations described in claims may be performed by separate devices. In this case, these devices can constitute the motion detector 2, 2B, or 2C. The motion detector 2, 2B, or 2C and a member having another function may be constituted by one device. That is, the motion detector 2, 2B, or 2C may be configured in any form as long as the motion detector 2, 2B, or 2C detects motion.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

As described above, a noise reducer according to the present disclosure can effectively reduce an afterimage while effectively obtaining advantages of noise reduction by bandwidth limitation along the time axis even when motion occurs in a picture with a low contrast. Thus, the noise reducer is useful and applicable to image video equipment such as digital cameras and video cameras.

What is claimed is:

1. A noise reducer, comprising:
a first subtractor configured to generate a difference N1 between an input video signal Ynow and a delayed video signal Ypre obtained by delaying an output video signal Yout by a time corresponding to one screen;
an amplitude adjuster configured to adjust an amplitude of an output signal of the first subtractor based on a motion signal MV;
a second subtractor configured to subtract an output N2 of the amplitude adjuster from the input video signal Ynow, thereby generating the output video signal Yout;
a frame memory configured to generate the delayed video signal Ypre obtained by delaying the output video signal Yout of the second subtractor by a time corresponding to one screen; and
a motion detector configured to calculate an amount of change in the input video signal Ynow with respect to the delayed video signal Ypre for each of pixels constituting one screen, and generate the motion signal MV for each of pixels such that the motion signal MV determines, as "moving," each of pixels of a predetermined proportion of all the pixels for each of which the amount of change is smaller than a predetermined threshold value.

2. The noise reducer of claim 1, wherein
the motion detector includes:
a first motion signal generator configured to generate a motion signal M1 which determines, as "moving," each of pixels constituting one screen when an amount of change in the input video signal Ynow with respect to the delayed video signal Ypre is equal to or larger than a first threshold value TH1;
a second motion signal generator configured to generate a motion signal M2 which determines, as "moving," each of pixels constituting one screen when the amount of change in the input video signal Ynow with respect to the delayed video signal Ypre is equal to or larger than a second threshold value TH2 which is smaller than the first threshold value TH1; and
a threshold value controller configured to adjust the second threshold value TH2 such that the motion signal M2 determines, as "moving," each of pixels of the predetermined proportion of all the pixels each determined as "not moving" by the motion signal M1, wherein
the motion signal M2 is the motion signal MV.

3. The noise reducer of claim 1, wherein
the motion detector includes:
a first motion signal generator configured to generate a motion signal M1 which determines, as "moving," each of pixels constituting one screen when an amount of change in the input video signal Ynow with respect to the delayed video signal Ypre is equal to or larger than a first threshold value TH1;
a suspected motion signal generator configured to generate a motion signal M3 which determines at random, as "moving," each of pixels of the predetermined proportion or more of all the pixels each determined as "moving" by the motion signal M1; and
a motion signal mixer configured to generate the motion signal MV which determines, as "moving," each of pixels determined as "moving" by one of the motion signal M1 or the motion signal M3.

4. The noise reducer of claim 1, wherein
the motion detector includes:
a noise generator configured to generate a random noise N3; and
a motion signal generator configured to generate a motion signal MV which determines, as "moving," each of pixels constituting one screen either when an amount of change in the input video signal Ynow with respect to the delayed video signal Ypre is equal to or larger than a first threshold value TH1 or when a value obtained by adding the random noise N3 to the amount of change in the input video signal Ynow with respect to the delayed video signal Ypre is equal to or larger than the first threshold value TH1.

* * * * *